US012722183B2

(12) United States Patent
Oshima et al.

(10) Patent No.: US 12,722,183 B2

(45) Date of Patent: Sep. 1, 2026

(54) RESIN-COATED METAL SHEET, RESIN-COATED DRAWN AND IRONED CAN, AND METHOD OF PRODUCING RESIN-COATED DRAWN AND IRONED CAN

(71) Applicant: JFE STEEL CORPORATION, Chiyoda-ku (JP)

(72) Inventors: Yasuhide Oshima, Chiyoda-ku (JP); Soichi Fujimoto, Chiyoda-ku (JP); Mitsunori Ota, Chiyoda-ku (JP)

(73) Assignee: JFE STEEL CORPORATION, Tokyo (JP)

( * ) Notice: Subject to any disclaimer, the term of this patent is extended or adjusted under 35 U.S.C. 154(b) by 774 days.

(21) Appl. No.: 17/757,471

(22) PCT Filed: Dec. 10, 2020

(86) PCT No.: PCT/JP2020/046170

§ 371 (c)(1),
(2) Date: Jun. 16, 2022

(87) PCT Pub. No.: WO2021/131765

PCT Pub. Date: Jul. 1, 2021

(65) Prior Publication Data

US 2023/0032654 A1 Feb. 2, 2023

(30) Foreign Application Priority Data

Dec. 23, 2019 (JP) ................................ 2019-231761

(51) Int. Cl.

| | |
|---|---|
| ***B05D 7/16*** | (2006.01) |
| ***B65D 25/14*** | (2006.01) |
| ***C09D 7/65*** | (2018.01) |
| ***C09D 167/02*** | (2006.01) |

(52) U.S. Cl.

CPC ............... *B05D 7/16* (2013.01); *B65D 25/14* (2013.01); *C09D 7/65* (2018.01); *C09D 167/02* (2013.01); *B05D 2252/10* (2013.01)

(58) Field of Classification Search

CPC .... B05D 7/16; B05D 2252/10; C09D 167/02; C09D 7/65; B65D 25/14

See application file for complete search history.

(56) References Cited

U.S. PATENT DOCUMENTS

| | | | |
|---|---|---|---|
| 6,652,979 B1 | 11/2003 | Takahashi et al. | |
| 6,723,441 B1 | 4/2004 | Yamanaka et al. | |
| 7,435,465 B2 | 10/2008 | Yamanaka et al. | |
| 9,993,998 B2 | 6/2018 | Yamanaka et al. | |
| 2005/0260417 A1 | 11/2005 | Yamanaka et al. | |
| 2016/0009444 A1 | 1/2016 | Nakagawa et al. | |
| 2017/0326842 A1 * | 11/2017 | Moritz | B32B 27/283 |

FOREIGN PATENT DOCUMENTS

| | | | |
|---|---|---|---|
| CN | 105008232 A | | 10/2015 |
| JP | 2001328204 A | | 11/2001 |
| JP | 2002264260 A | | 9/2002 |
| JP | 2002347170 A | * | 12/2002 |
| JP | 2003127277 A | | 5/2003 |
| JP | 2004131564 A | | 4/2004 |
| JP | 2004168365 A | | 6/2004 |
| JP | 2019025739 A | * | 2/2019 |
| WO | 2015125459 A1 | | 8/2015 |

OTHER PUBLICATIONS

Machine translation of JP-2002347170-A (Year: 2002).*

Machine translation of JP-2019025739-A (Year: 2019).*

May 19, 2023, the Extended European Search Report issued by the European Patent Office in the corresponding European Patent Application No. 20905692.8.

Feb. 22, 2021, International Search Report issued in the International Patent Application No. PCT/JP2020/046170.

Mar. 16, 2022, Office Action issued by the Taiwan Intellectual Property Office in the corresponding Taiwanese Patent Application No. 109144626 with English language Search Report.

Mar. 8, 2022, Notification of Reasons for Refusal issued by the Japan Patent Office in the corresponding Japanese Patent Application No. 2021-514136 with English language Concise Statement of Relevance.

Nov. 28, 2023, Office Action issued by the China National Intellectual Property Administration in the corresponding Chinese Patent Application No. 202080089106.7 with English language search report.

* cited by examiner

*Primary Examiner* — Amber R Orlando
*Assistant Examiner* — Ryan Patrick Loughran
(74) *Attorney, Agent, or Firm* — KENJA IP LAW PC

(57) ABSTRACT

Provided is a resin-coated metal sheet that, even when used in a DI can, ensures excellent removability for various contents and stably satisfies various properties required of container material. A resin-coated metal sheet comprises: a metal sheet; and a coating layer of a resin containing a polyester resin as a main component, on at least one surface of both surfaces of the metal sheet, wherein the coating layer has a thickness of 21 μm or more and 38 μm or less, contains 0.01 mass % or more and 2.00 mass % or less of a wax compound, and has a surface indentation modulus of 2000 MPa or more and 3400 MPa or less.

18 Claims, No Drawings

RESIN-COATED METAL SHEET, RESIN-COATED DRAWN AND IRONED CAN, AND METHOD OF PRODUCING RESIN-COATED DRAWN AND IRONED CAN

TECHNICAL FIELD

The present disclosure relates to a resin-coated metal sheet, a resin-coated drawn and ironed can, and a method of producing the resin-coated drawn and ironed can.

BACKGROUND

Conventionally, metal sheets of tin free steel (TFS), tinplate, aluminum, etc. as material for metal cans used as food cans are painted in order to improve corrosion resistance, durability, and the like. Baking is essential for such painting. The baking process, however, has problems in that it is complex, time-consuming, and discharges a large amount of solvent.

To solve these problems, resin-coated metal sheets have been developed as can material to replace painted metal sheets. A resin-coated metal sheet is obtained by laminating a thermoplastic resin film on the surface of a heated metal sheet. Currently, resin-coated metal sheets are widely used industrially as material for food cans, beverage cans, and so on.

However, the use of a resin-coated metal sheet in a food can has a problem in that it is difficult to remove the contents from the container because the contents firmly adhere to the inner surface of the container. In view of this problem, JP 2001-328204 A (PTL 1) and WO 2015/125459 A1 (PTL 2) each propose a technique of achieving favorable contents removability by adding a specific wax compound into a polyester resin film to cause the wax compound to be present on the resin film surface.

CITATION LIST

Patent Literature

PTL 1: JP 2001-328204 A
PTL 2: WO 2015/125459 A1

SUMMARY

Technical Problem

The techniques described in PTL 1 and PTL 2 achieve sufficient contents removability for cans with low amounts of deformation such as drawn cans or drawn and redrawn cans (DRD cans), but fail to achieve sufficient contents removability for cans with high amounts of deformation such as drawn and ironed cans (hereafter also referred to as "DI cans") and thus have room for improvement.

It could therefore be helpful to provide a resin-coated metal sheet that, even when used in a DI can, ensures excellent removability for various contents and stably satisfies various properties required of container material.

Solution to Problem

To solve the problem stated above, we investigated the cause of insufficient contents removability in the case of applying the foregoing conventional techniques to DI cans. We consequently found out the following: In the production of a DI can, the metal sheet generates heat by ironing and is formed into the can at a high temperature exceeding the melting point of the wax, so that the wax desorbs from the surface of the coating layer of resin and as a result the lubricity of the surface of the coating layer decreases. We then looked at the coating layer of resin that, when the DI can is formed using the resin-coated metal sheet, is situated at the inner surface of the can, and conducted intensive study on the coating layer. We consequently discovered that, by adding a wax compound to the coating layer having optimal thickness and controlling the mechanical properties of the surface of the coating layer, a resin-coated metal sheet that ensures excellent contents removability and satisfies other required properties (such as adhesion property, DI formability, and corrosion resistance) can be obtained.

The present disclosure is based on these discoveries. We thus provide the following.

[1] A resin-coated metal sheet comprising: a metal sheet; and a coating layer of a resin containing a polyester resin as a main component, on each of both surfaces of the metal sheet, wherein the coating layer on at least one surface of the both surfaces of the metal sheet has a thickness of 21 μm or more and 38 μm or less, contains 0.01 mass % or more and 2.00 mass % or less of a wax compound, and has a surface indentation modulus of 2000 MPa or more and 3400 MPa or less.

[2] The resin-coated metal sheet according to [1], wherein the coating layer on the at least one surface is made up of at least two layers that differ in content percentage of the wax compound, and an outermost layer of the at least two layers has a thickness of 3 μm or more and 10 μm or less and contains 0.10 mass % or more and 2.00 mass % or less of the wax compound.

[3] The resin-coated metal sheet according to [1] or [2], wherein the coating layer on an other surface of the both surfaces of the metal sheet contains 0.01 mass % or more and 2.00 mass % or less of the wax compound and has a surface indentation modulus of 2000 MPa or more and 3400 MPa or less.

[4] The resin-coated metal sheet according to any of [1] to [3], wherein the wax compound contains carnauba wax.

[5] A resin-coated drawn and ironed can comprising a coating layer of a resin containing a polyester resin as a main component, on at least an inner surface of the can, wherein a water contact angle of a surface of the coating layer is 80° or more and 100° or less.

[6] A method of producing a resin-coated drawn and ironed can, comprising: drawing the resin-coated metal sheet according to any of [1] to [4] to form a cup-shaped formed body; and ironing the cup-shaped formed body to have a can body having a minimum sheet thickness being 80% or less of an original sheet thickness.

Advantageous Effect

It is thus possible to provide a resin-coated metal sheet that does not suffer desorption of an added wax compound even when subjected to drawing and ironing with a high amount of deformation. A drawn and ironed can obtained by subjecting such a resin-coated metal sheet to drawing and ironing has excellent removability for various contents. The resin-coated metal sheet also stably satisfies many properties required as can material subjected to drawing and ironing.

DETAILED DESCRIPTION

A resin-coated metal sheet according to one of the disclosed embodiments will be described in detail below.

The resin-coated metal sheet is a resin-coated metal sheet comprising: a metal sheet; and an inner surface coating layer of a resin containing a polyester resin, on each of both surfaces (i.e. both sides) of the metal sheet, wherein the coating layer on at least one surface of the both surfaces of the metal sheet has a thickness of 21 μm or more and 38 μm or less, contains 0.01 mass % or more and 2.00 mass % or less of a wax compound, and has a surface indentation modulus of 2000 MPa or more and 3400 MPa or less.

First, the metal sheet used in one of the disclosed embodiments will be described below. As the metal sheet of the resin-coated metal sheet according to one of the disclosed embodiments, an aluminum sheet, a mild steel sheet, or the like widely used as can material can be used. In particular, a chromium-coated steel sheet (hereafter also referred to as "TFS") having a two-layer coating composed of a lower layer of metal chromium and an upper layer of chromium hydroxide is suitable from the viewpoint of the resin adhesion property in a high-temperature and humid environment during retort sterilization. The respective coating weights of the metal chromium layer and the chromium hydroxide layer of TFS are not limited. From the viewpoint of the adhesion property to the below-described coating layer of resin and the corrosion resistance, the coating weight of the metal chromium layer is preferably 70 mg/$m^2$ or more and 200 mg/$m^2$ or less and the coating weight of the chromium hydroxide layer is preferably 10 mg/$m^2$ or more and 30 mg/$m^2$ or less in terms of Cr.

The resin-coated metal sheet includes a coating layer of resin containing a polyester resin as a main component on both surfaces of the metal sheet described above. The coating layer on any one of the two surfaces has a thickness of 21 μm or more and 38 μm or less, contains 0.01 mass % or more and 2.00 mass % or less of a wax compound, and has a surface indentation modulus of 2000 MPa or more and 3400 MPa or less. When the resin-coated metal sheet is formed into a DI can, this coating surface forms the inner surface of the can. That is, the can includes the coating layer of resin containing a polyester resin as a main component at its inner surface. The coating layer formed on the one surface (corresponding to the can inner surface) is hereafter referred to as "inner surface coating layer".

[Composition of Inner Surface Coating Layer]

The resin constituting the coating layer contains a polyester resin as a main component. The expression "containing a polyester resin as a main component" herein denotes that the content of the polyester resin in the resin is 90 mass % or more. In other words, the total content of resins, such as the foregoing wax compound and impact absorbing resin, other than the polyester resin is 10 mass % or less.

The polyester resin is a polymer composed of a dicarboxylic acid component and a glycol component, and preferably contains 90 mol % or more of terephthalic acid as the dicarboxylic acid component. If the content of terephthalic acid in the polyester resin is 90 mol % or more, the heat resistance is sufficiently high, and more stable formability and coatability are ensured against frictional heat during container (can) forming. The content of terephthalic acid is more preferably 95 mol % or more.

Examples of the dicarboxylic acid component other than terephthalic acid include aromatic dicarboxylic acids such as isophthalic acid, naphthalenedicarboxylic acid, diphenyldicarboxylic acid, 5-sodium sulfoisophthalic acid, and phthalic acid, aliphatic dicarboxylic acids such as oxalic acid, succinic acid, adipic acid, sebacic acid, dimer acid, maleic acid, and fumaric acid, alicyclic dicarboxylic acids such as cyclohexanedicarboxylic acid, and oxycarbonic acids such as p-oxybenzoic acid.

Examples of the glycol component include aliphatic glycols such as ethylene glycol, propanediol, butanediol, pentanediol, hexanediol, and neopentyl glycol, alicyclic glycols such as cyclohexanedimethanol, and aromatic glycols such as bisphenol A and bisphenol S. Of these glycol components, ethylene glycol is preferable. Two or more of these dicarboxylic acid components may be used together, and two or more of these glycol components may be used together.

The inner surface coating layer needs to contain an appropriate amount of a wax compound.

[Wax Compound]

The inner surface coating layer contains 0.01 mass % or more and 2.00 mass % or less of a wax compound. The wax compound is added in order to reduce the surface free energy of the resin layer. If the content of the wax compound is 0.01 mass % or more, the contents are prevented from adhering to the inner surface coating layer in a can formed from the resin-coated metal sheet, and the contents removability is improved. If the content of the wax compound is more than 2.00 mass %, the adhesion property to the base metal is likely to degrade. Moreover, the film formation of the inner surface coating layer itself is difficult, and the productivity decreases.

The inner surface coating layer may have a single-layer structure containing 0.01 mass % or more and 2.00 mass % or less of the wax compound, or a multilayer structure made up of at least two layers that differ in the content percentage of the wax compound. In the inner surface coating layer having such a multilayer structure, the foregoing effect can be enhanced by limiting the content of the wax compound in the outermost layer which comes into contact with the contents in a can produced using the resin-coated metal sheet to 0.10 mass % or more and 2.00 mass % or less. In detail, given that the physical properties of the surface of the coating layer have a dominant influence on the contents removability, by increasing the amount of wax in the outermost layer, the amount of wax on the surface of the coating layer increases and the effect of improving the contents removability is enhanced.

Each layer of the inner surface coating layer having the multilayer structure other than the outermost layer preferably does not contain the wax compound or contains only a trace amount of the wax compound. Only the wax compound contained in the surface layer substantially contributes to higher contents removability, and adding the wax compound to the layers other than the outermost layer is not preferable because the resin costs increases. On the other hand, if the content of the wax compound differs greatly between the outermost layer and the layer adjacent to the outermost layer, the resin properties differ greatly between these layers, so that the adhesion property between the layers may decrease. It is therefore effective to add 0.1 mass % or less of the wax compound to the adjacent layer. Herein, the content of the wax compound in the inner surface coating layer having the multilayer structure is the average of all layers.

As a component of the wax compound, an organic or inorganic lubricant may be used. Examples include polyolefin-based waxes such as polyethylene wax and polypropylene wax, polyamide-based waxes, and polyester-based waxes. Natural waxes, in particular carnauba wax which is one type of vegetable wax, are preferable. Carnauba wax has a high melting point of 80° C. or more and is unlikely to melt at working temperature, and also has high affinity with the coating layer of the polyester resin. The polyester resin containing wax can be produced by a typical production method after blending polyester with a predetermined amount of wax.

An appropriate index when achieving optimal contents removability in a can obtained by drawing and ironing the resin-coated metal sheet is surface free energy. The can obtained by drawing and ironing the resin-coated metal sheet is typically heat-treated in order to reduce internal stress generated in the coating layer as a result of working and enhance the adhesion property of the coating layer. Hence, it is preferable to optimize the surface free energy after the heat treatment. The optimal heat treatment temperature and time vary depending on the amount of deformation and the resin type. In the case of using a polyester resin film containing polyethylene terephthalate as a main component in the coating layer, heat treatment at 210° C. to 230° C. for 2 min is suitable. The water contact angle of the surface of the inner surface coating layer located at the inner surface of the can after such heat treatment is preferably 80° or more and 100° or less. The coating layer preferably contains carnauba wax in the above-described content range from among the foregoing waxes.

[Thickness of Inner Surface Coating Layer]

The thickness of the coating layer is 21 μm or more and 38 μm or less. If the thickness is less than 21 μm, when the coating layer is stretched thin in ironing with a high amount of deformation, the amount of wax at the surface of the coating layer is likely to be insufficient. If the thickness is more than 38 μm, further improvement in the contents removability and other functions required of food can material is unlikely to be achieved, and only the resin costs increase. The thickness of the coating layer is therefore 21 μm or more and 38 μm or less. The thickness of the coating layer is more preferably 26 μm or more. The thickness of the coating layer is more preferably 32 μm or less.

The thickness of the outermost layer in the case where the coating layer is made up of two or more layers that differ in the content percentage of the wax compound is preferably 3 μm or more and 10 μm or less. If the thickness of the outermost layer containing the wax compound is 3 μm or more, better contents removability can be achieved. If the thickness of the outermost layer is more than 10 μm, the performance is not improved, and only the resin costs increase. The thickness of the outermost layer is therefore preferably 3 μm or more and 10 μm or less.

[Mechanical Properties of Surface of Inner Surface Coating Layer]

It is important that the coating layer has a surface indentation modulus of 2000 MPa or more and 3400 MPa or less. As mentioned above, the techniques of ensuring favorable contents removability by adding wax into a polyester resin to cause the wax to be present on the surface of the resin layer are already in actual use. Such techniques are, however, intended for cans with low amounts of deformation such as drawn cans and DRD cans. In the production of DI cans with higher amounts of deformation than these cans, the surface of the metal sheet is exposed to sliding motion with a die at very high surface pressure in ironing, and the metal sheet generates heat when worked. Thus, the metal sheet is worked at a high temperature exceeding the melting point of the wax and formed into a can. The wax desorbs from the surface of the coating layer unless the mechanical properties of the surface of the coating layer are appropriate.

As a result of intensive study, we discovered that the contents removability can be significantly improved even in DI cans by controlling the indentation modulus of the surface of the coating layer of the resin-coated metal sheet to be 2000 MPa or more and 3400 MPa or less. The reason for this is as follows.

When the surface of the coating layer is a flexible surface with an indentation modulus of 3400 MPa or less, the film surface elastically deforms and depressions form on the surface during ironing, and the wax enters the depressions and resists desorption. If the indentation modulus is more than 3400 MPa, the depressions in the ironing are small and the desorption of the wax cannot be prevented sufficiently. This effect is achieved if the indentation modulus is 3400 MPa or less. The indentation modulus is more preferably 3000 MPa or less, to further enhance the effect. The depressions on the film surface form in the elastically deformed region, and accordingly do not remain after the ironing.

If the indentation modulus of the surface of the coating layer is less than 2000 MPa, the depressions in the ironing are excessively large and exceed elastic deformation, and tend to remain as flaws after can production. It is therefore necessary to control the indentation modulus to 2000 MPa or more. The indentation modulus is preferably 2300 MPa or more.

The method of controlling the mechanical properties of the surface of the coating layer is not limited. For example, the mechanical properties can be controlled by reducing the orientation of the resin of the surface of the coating layer in lamination treatment according to the below-described production method. In detail, the mechanical properties can be controlled by reheating to not less than the melting point of the resin of the coating layer to melt the resin after the lamination treatment.

When the resin-coated metal sheet is formed into a DI can, the other surface of the two surfaces of the metal sheet forms the outer surface of the can. The coating layer formed on the other surface (corresponding to the can outer surface) is hereafter referred to as "outer surface coating layer".

[Composition of Outer Surface Coating Layer]

The resin constituting the outer surface coating layer contains a polyester resin as a main component. The expression "containing a polyester resin as a main component" herein denotes that the content of the polyester resin in the resin is 90 mass % or more. In other words, the total content of resins, such as the foregoing wax compound and impact absorbing resin, other than the polyester resin is 10 mass % or less.

The polyester resin is a polymer composed of a dicarboxylic acid component and a glycol component, and preferably contains 90 mol % or more of terephthalic acid as the dicarboxylic acid component. If the content of terephthalic acid in the polyester resin is 90 mol % or more, more stable properties are ensured against frictional heat during container forming. Moreover, the resin layer can sufficiently withstand attacks from water vapor in retort sterilization treatment after container forming.

Examples of the dicarboxylic acid component other than terephthalic acid include aromatic dicarboxylic acids such as isophthalic acid, naphthalenedicarboxylic acid, diphenyldicarboxylic acid, 5-sodium sulfoisophthalic acid, and phthalic acid, aliphatic dicarboxylic acids such as oxalic acid, succinic acid, adipic acid, sebacic acid, dimer acid, maleic acid, and fumaric acid, alicyclic dicarboxylic acids such as cyclohexanedicarboxylic acid, and oxycarbonic acids such as p-oxybenzoic acid.

Examples of the glycol component include aliphatic glycols such as ethylene glycol, propanediol, butanediol, pentanediol, hexanediol, and neopentyl glycol, alicyclic glycols such as cyclohexanedimethanol, and aromatic glycols such as bisphenol A and bisphenol S. Of these glycol components, ethylene glycol and butylene glycol are preferable. Two or more of these dicarboxylic acid components may be used together, and two or more of these glycol components may be used together.

The composition of the outer surface coating layer is preferably a polyester composition that is obtained by mixing polyethylene terephthalate or copolymerized polyethylene terephthalate whose copolymer component has a content percentage of less than 6 mol % (hereafter also referred to as "polyester (1)") and polybutylene terephthalate (hereafter also referred to as "polyester (2)") and in which the ratio of the polyester (1) is 60 mass % or less and the ratio of the polyester (2) is 40 mass % or more. By using such a resin composition, in retort sterilization treatment which is essential for food cans, the adhesion property to the metal sheet can be maintained and the discoloration of the resin caused by water vapor condensing in the coating layer can be prevented. If the ratio of the polyester (2) is 70 mass % or less, the resin strength and the corrosion resistance can be further improved. The ratio of the polyester (2) is therefore preferably in a range of 40 mass % to 70 mass %.

[Thickness of Outer Surface Coating Layer]

The thickness of the outer surface coating layer is preferably 10 μm or more, from the viewpoint of design. From the viewpoint of the effect by adding the wax, too, the thickness of the outer surface coating layer is preferably 10 μm or more, and more preferably 15 μm or more. If the thickness of the outer surface coating layer is more than 30 μm, further improvement in performance and appearance by an increase in film thickness cannot be expected. This is disadvantageous in terms of the production costs. The thickness of the outer surface coating layer is therefore preferably 30 μm or less.

In the case where the outer surface coating layer is made up of two or more resin layers including, for example, a pigment-containing layer, the outermost layer is a resin layer containing no pigment. The thickness of the outermost resin layer is preferably 1.5 μm or more. The outer surface coating layer may be made up of three or more layers. The outer surface coating layer further preferably has a structure of three or more layers in which an adhesion layer excellent in adhesion property to the metal sheet on the metal sheet side is provided between the outer surface coating layer and the metal sheet. The adhesion layer preferably has good adhesion property to the metal sheet and is compatible with polyethylene terephthalate contained in the coating layer on the adhesion layer. On the can outer surface side, an adhesive such as epoxy phenol may be used in the adhesion layer from the viewpoint of the costs and the corrosion resistance.

The outer surface coating layer preferably contains an appropriate amount of a wax compound, as in the inner surface coating layer.

[Wax Compound]

To enhance formability in can production, it is preferable that the outer surface coating layer contains 0.01 mass % or more and 2.00 mass % or less of a wax compound and the indentation modulus of the surface of the outer surface coating layer is 2000 MPa or more and 3400 MPa or less. In detail, as in the case of the can inner surface, the wax remains in the depressions formed on the surface of the outer surface coating layer during ironing. This can improve the lubricity of the surface of the coating layer in the ironing, and suppress surface flaws and the like caused by the ironing. The content of the wax compound is more preferably 0.10 mass % or more, to achieve better lubricity. The content of the wax compound is preferably 2.00 mass % or less, because the strength and film production of the outer surface coating layer are further improved.

The outer surface coating layer may have a single-layer structure containing 0.01 mass % or more and 2.00 mass % or less of the wax compound, or a multilayer structure made up of at least two layers that differ in the content percentage of the wax compound. In the outer surface coating layer having such a multilayer structure, the foregoing effect can be enhanced by limiting the content of the wax compound in the outermost layer which comes into contact with an ironing die in can production to 0.10 mass % or more and 2.00 mass % or less.

The wax compound is not limited. The wax compound may be any of an organic lubricant and an inorganic lubricant, as in the case of the inner surface coating layer. The same wax component as in the inner surface coating layer may be used, but a wax compound having a high melting point is preferable because the temperature of the surface of the coating layer on the can outer surface side tends to become higher than on the can inner surface side due to friction with the die during ironing. The melting point of the wax compound is preferably 80° C. or more, and more preferably 100° C. or more. Examples of preferable wax compounds include fatty acid esters such as carnauba wax and candelilla wax which are natural waxes, and polyolefin waxes such as polyethylene wax. These wax compounds may be used alone or in a mixture of two or more. The outer surface coating layer may be made up of two or more layers, as mentioned above. In this case, it is preferable to add the wax only to the outermost layer.

[Mechanical Properties of Surface of Outer Surface Coating Layer]

The indentation modulus of the surface of the outer surface coating layer is preferably 2000 MPa or more and 3400 MPa or less. As a result of the indentation modulus of the surface of the outer surface coating layer being 3400 MPa or less, the surface of the coating layer elastically deforms and depressions form on the surface during ironing, and the wax enters the depressions and resists desorption, as in the inner surface coating layer. As a result of the indentation modulus of the surface of the outer surface coating layer being 2000 MPa or more, better surface characteristics can be maintained. The indentation modulus is more preferably 2500 MPa or more.

Such mechanical properties of the surface of the outer surface coating layer can be controlled, for example, by reheating to not less than the melting point of the resin layer to melt the resin layer after the lamination, as in the case of the inner surface coating layer.

The outer surface coating layer and/or the inner surface coating layer may contain a color pigment, in order to maintain the aesthetic appearance of the can outer surface and/or the can inner surface after can forming or retort sterilization treatment. The color pigment is preferably titanium dioxide for white appearance, and a disazo-based organic pigment for bright golden appearance. In the case of adding the color pigment to the outer surface coating layer and/or the inner surface coating layer, it is preferable that the coating layer is made up of two or more layers and the color pigment is added to at least one resin layer other than the outermost layer. As a result of the outermost layer not containing the color pigment, the color pigment can be prevented from precipitating to the resin layer surface.

As the disazo-based organic pigment, C. I. Pigment Yellow 180 is particularly preferable. C. I. Pigment Yellow 180 is a pigment registered in the Food and Drug Administration (FDA), and has excellent safety and can provide excellent color tone. The amount of the pigment added to the outer surface coating layer and/or the inner surface coating layer is preferably 0.1 mass % or more and 20.0 mass % or less, from the viewpoint of coloring and resin transparency. The particle size of the pigment is preferably less than 1 μm, from the viewpoint of resin transparency. A metal salt of higher fatty acid such as magnesium stearate may be used as a dispersant. The use of the dispersant makes it possible to achieve more uniform color tone with higher transparency.

The addition of the white pigment hides the metallic luster of the base and improves the image clearness on the printing surface, providing favorable appearance. The white pigment needs to exhibit excellent design after container forming. From this viewpoint, titanium dioxide is preferably used. Titanium dioxide is suitable because it has high tinting strength and high ductility and thus can ensure favorable design even after can formation. The amount of the white pigment added to the outer surface coating layer and/or the inner surface coating layer is preferably 10 mass % or more and 30 mass % or less, from the viewpoint of coloring and resin properties.

Moreover, it is preferable to add 0.0001 mass % or more and 1.0 mass % or less of a known antioxidant to the resin constituting each of the outer surface coating layer and the inner surface coating layer, from the viewpoint of improving the heat resistance. The content of the antioxidant is more preferably 0.001 mass % or more. The content of the antioxidant is more preferably 1.0 mass % or less. The type of the antioxidant is not limited, and any of known antioxidants classified as hindered phenols, hydrazines, phosphites, and the like may be used.

The resin constituting the resin layer of the resin-coated metal sheet according to one of the disclosed embodiments may contain various additives other than the antioxidant, such as a lubrication promoter, a crystal nucleating agent, a heat stabilizer, an antistatic agent, an antiblocking agent, a filler, and a viscosity modifier, without impeding the effects according to one of the disclosed embodiments.

[Production Method]

An example of a method of producing the resin-coated metal sheet according to one of the disclosed embodiments will be described below, although the present disclosure is not limited to such.

In the production of the resin-coated metal sheet according to one of the disclosed embodiments, the foregoing thermoplastic resin film as the coating layer is produced first. In detail, the thermoplastic resin is prepared in the form of pellets or the like. The pellets are optionally dried in hot air or under vacuum, and then are supplied to an extruder together with various additives. The pellets are turned into the resin heated to the melting point or higher and melted in the extruder, and extruded in an amount made uniform by a gear pump or the like, with foreign matter, modified resin, and the like being removed using a filter or the like. In the case where the thermoplastic resin film has a laminate structure, an extruder different from the above is used, and the resin forming each layer is fed into a stacking device through a different flow path. As the stacking device, a feed block or a multi-manifold die may be used.

These resins are formed into a sheet with a T-die and then discharged. The molten sheet discharged from the T-die is extruded onto a cooling body such as a casting drum, and then cooled and solidified to form a non-stretched film. Here, for the purpose of enhancing the adhesion property between the cooling body such as a casting drum and the molten sheet, it is preferable to bring the molten sheet into close contact with the cooling body by an electrostatic force using electrodes in wire shape, tape shape, needle shape, knife shape, or the like to quench and solidify the molten sheet. Other preferable methods include a method of blowing air from a slit-shaped, spot-shaped, or planar device to bring the molten sheet into close contact with the cooling body to be quenched and solidified, a method of bringing the molten sheet into close contact with the cooling body by nip rolls to be quenched and solidified, and a combination of these methods.

The non-stretched film obtained in this way is preferably biaxially stretched in the longitudinal direction and the transverse direction. Examples of biaxial stretching methods that can be used include a sequential biaxial stretching method of stretching the film in the longitudinal direction and then stretching the film in the transverse direction or stretching the film in the transverse direction and then stretching the film in the longitudinal direction and a simultaneous biaxial stretching method of stretching the film simultaneously in the longitudinal direction and the transverse direction. In the case of using the sequential biaxial stretching method, it is preferable to stretch the film in the longitudinal direction and then stretch the film in the transverse direction, from the viewpoint of uniform quality and space saving.

Next, the method of producing the resin-coated metal sheet will be described below. In detail, after producing a metal sheet having the foregoing resin film laminated on one or both sides (resin film-laminated metal sheet) by a known method, the resin film-laminated metal sheet is reheated and subjected to heat treatment. Thus, the resin-coated metal sheet in which the indentation modulus of the surface of the resin coating layer is controlled can be produced.

The resin film-laminated metal sheet is preferably formed by bonding the resin film whose coating layer is made of the thermoplastic resin to the metal sheet by thermocompression bonding. As the method of forming the resin coating layer on the metal sheet, a method (thermocompression bonding film lamination method) whereby the metal sheet is heated to a temperature exceeding the melting point of the thermoplastic resin film and the resin film is brought into contact with the metal sheet using pressure rolls and heat-sealed is available. The thermocompression bonding film lamination method is preferable because it is inexpensive and energy-saving and facilitates the functionalization of the coating layer by the resin film.

In the lamination, the time (thermocompression bonding time) during which the resin film passes between the pressure rolls is preferably 10 msec or more and 40 msec or less, and more preferably 15 msec or more and 30 msec or less. If the thermocompression bonding time is less than 10 msec, the orientation of the film resin tends to remain, which may cause the indentation modulus of the surface of the film resin coating layer to be higher than the foregoing expected range. If the thermocompression bonding time is more than 40 msec, the orientation of the film resin tends to collapse, which may cause the indentation modulus of the surface of the resin coating layer to be lower than the foregoing expected range.

As the heat treatment method, a method of passing the resin film-laminated metal sheet through a heating furnace such as an induction heating (IH) furnace, an infrared (IR) furnace or a hot air oven, a method of passing the resin film-laminated metal sheet between successively installed heating rolls, and the like are preferable. The heating temperature is preferably not less than the melting point of the resin layer. The heating temperature is preferably not more than (the melting point+20° C.). If the heating temperature is less than the melting point of the resin layer, the orientation of the film resin does not collapse, which may cause the indentation modulus of the surface of the film resin coating layer to be higher than the foregoing expected range. If the heating temperature is more than (the melting point of the resin layer+20° C.), the orientation of the film resin tends to collapse, which may cause the indentation modulus of the surface of the resin coating layer to be lower than the foregoing expected range.

In the heat treatment, the resin film-laminated metal sheet is preferably heated so as to take 0.5 sec to 10 sec to reach the heating temperature, and then cooled. The heating rate is preferably 30° C./sec or more. The heating rate is preferably 500° C./sec or less. The heating rate is more preferably 80° C./sec or more. The heating rate is more preferably 300° C./sec or less. If the heating rate is less than 30° C./sec, not only the production efficiency is low, but also the orientation of the film resin tends to collapse, which may cause the indentation modulus of the surface of the coating layer to be lower than the foregoing expected range. If the heating rate is more than 500° C./sec, it is often difficult to control the heating temperature. Under such conditions, the heating temperature tends to vary depending on the product position and the production timing, as a result of which the indentation modulus of the surface of the coating layer may vary.

The heat-treated resin-coated metal sheet is then cooled immediately. As the method of cooling the heated metal sheet, water cooling using temperature-controlled water or gas cooling using air, nitrogen, helium, etc. is preferable. From the viewpoint of simplifying the line and preventing uneven cooling of the metal sheet, water cooling is preferable. As the water cooling method, a method of directly immersing the heated metal sheet in a water tank in which water is stored or a method of spraying water from a nozzle, a pipe, or the like toward the metal sheet is preferably used. The cooling temperature is preferably 5° C. or more. The cooling temperature is preferably not more than (the glass transition temperature of the resin layer−10° C.). The cooling temperature is more preferably 20° C. or more. The cooling temperature is more preferably not more than (the glass transition temperature of the resin−25° C.). If the cooling temperature is less than 5° C., dew condensation may occur on the cooled resin-coated metal sheet or surrounding equipment, or moisture adhering to the cooled resin-coated metal sheet may be hard to be removed in a subsequent process. If the cooling temperature is more than (the glass transition temperature of the resin layer−10° C.), the physical properties may vary depending on the product position as the amorphous structure existing inside the coating layer maintains fluidity.

[Can Production Method]

Drawing and ironing the resin-coated metal sheet according to one of the disclosed embodiments yields a resin-coated DI can. The DI can is a two-piece can with no seams between the can body and the bottom as with a DRD can, and is obtained by working, by ironing or redrawing and ironing, a drawn can produced by drawing (cupping) the metal sheet.

Herein, drawing is a working method whereby a disk-shaped piece cut out of a metal sheet is fixed by a blank holding mechanism and formed into a bottomed cup shape by a punch and a die using a drawing machine called a cupping press. Ironing is a working method whereby the side wall of the cup obtained by drawing is stretched thin.

For DI forming used in one of the disclosed embodiments, a commercially available cupping press and DI forming device may be used, regardless of differences in specifications. In these devices, appropriate drawing and ironing are combined to obtain a desired shape. In the case where the diameter of the disk-shaped piece cut out of the metal sheet is excessively large as compared with the diameter of the ironing punch in drawing, it is difficult to obtain a cup of a required shape in one drawing operation. In such a case, two drawing operations (drawing and redrawing) are performed to obtain the required shape. In this process, a cup relatively large in diameter is produced by a cupping press, then redrawn by a body maker (can body forming machine), and then ironed.

In DI forming used in one of the disclosed embodiments, ironing is preferably performed to make the can body have a minimum sheet thickness being 80% or less of the original sheet thickness. In DI forming with a smaller amount of ironing than this, wax desorption does not occur even when the surface is not flexible as in one of the disclosed embodiments. Hence, it is particularly effective to apply the presently disclosed techniques to such DI forming that makes the minimum sheet thickness of the can body to be 80% or less of the original sheet thickness.

In DI forming, working may be performed without using a coolant. In the case of using a coolant for DI forming, water or an aqueous solution containing a component having high food safety is preferable. If such a coolant adheres to the can when circulated in the device to perform cooling in ironing (and redrawing) in the DI forming device, simple cleaning suffices. For lubrication during drawing by the cupping press, it is preferable to apply a wax to the laminate metal sheet surface. Favorable formability is exhibited when 10 mg/m$^2$ to 500 mg/m$^2$ of paraffin or fatty acid ester-based wax with a melting point of 30° C. to 80° C. is applied.

After the forming in the DI forming device, cleaning may or may not be performed. Heat treatment is then preferably performed for subsequent drying and improvement in film adhesion property. The heat treatment is performed by heating at a temperature not less than the crystallization temperature of the resin layer on one or both surfaces and not more than (the melting point of the resin layer−10° C.) for 1 sec to 10 min.

[Resin-Coated Drawn and Ironed Can]

Drawing and ironing the foregoing resin-coated metal sheet under the foregoing production conditions yields a resin-coated drawn and ironed can. As a result of an appropriate amount of wax remaining in the coating layer forming the inner surface of the can, the water contact angle of the surface of the coating layer at the can inner surface is 80° or more and 100° or less, so that excellent contents removability is achieved. If the water contact angle (also simply referred to as "contact angle") of the surface of the coating layer is 80° or more and 100° or less, the can has excellent contents removability as a DI can. If the contact angle is less than 80°, the contents removability is insufficient. If the contact angle is more than 100°, the amount of wax on the film surface is excessive and the wax accumulates on the forming tool or the like, which is not desirable.

The following mechanism ensures the foregoing contact angle in the drawn and ironed can. Since the wax is situated on the flexible film surface, the wax enters the depressions formed on the film surface as a result of elastic deformation of the surface during intense ironing and is prevented from dropping, and thus a large amount of wax remains on the surface. In the resin-coated metal sheet described in each of PTL 1 and PTL 2, the film surface is rigid, so that the wax on the film surface desorbs during ironing and the amount of wax remaining on the surface decreases, causing a decrease in contact angle.

The minimum sheet thickness of the can body of the resin-coated drawn and ironed is preferably 80% or less of the original sheet thickness as a result of ironing. In DI forming with a smaller amount of ironing than this, wax desorption does not occur even when the surface is not flexible as in one of the disclosed embodiments. Hence, it is particularly effective to apply the presently disclosed techniques to such an ironed can whose minimum sheet thickness is 80% or less of the original sheet thickness.

As a result of performing heat treatment for stress relaxation and sterilization of the resin layer after forming the can by subjecting the resin-coated metal sheet to DI working, the resin coating layer at the can inner surface in one of the disclosed embodiments has a thickness of 10 μm or more and 25 μm or less and a surface indentation modulus of 2000 MPa or more and 3400 MPa or less.

The minimum sheet thickness of the can body of the resin-coated drawn and ironed can is preferably 80% or less of the original sheet thickness as a result of ironing. In DI forming with a smaller amount of ironing than this, wax desorption does not occur even when the surface is not flexible as in one of the disclosed embodiments. Hence, it is particularly effective to apply the presently disclosed techniques to such an ironed can whose minimum sheet thickness is 80% or less of the original sheet thickness.

After forming the can by subjecting the resin-coated metal sheet to DI working, heat treatment is performed for stress relaxation and sterilization of the resin layer. Consequently, the resin coating layer at the can inner surface in one of the disclosed embodiments has a thickness of 10 μm or more and 25 μm or less and a surface indentation modulus of 2000 MPa or more and 3400 MPa or less.

Examples

The presently disclosed techniques will be described in more detail below by way of an example.

In this example, steel sheets subjected to cold rolling, annealing, and temper rolling and having a thickness of 0.20 mm and a tempering degree of T3 were each subjected to degreasing, pickling, and chromium coating treatment to produce a chromium-coated steel sheet (TFS). In the chromium coating treatment, the steel sheet was chromium-coated in a chromium coating bath containing $CrO_3$, $F^-$, and $SO_4^{2-}$, and, after intermediate rinsing, electrolyzed in a chemical conversion treatment liquid containing $CrO_3$ and $F^-$. Here, the electrolysis conditions (current density, electric quantity, etc.) were adjusted so that the coating weights of metal chromium and chromium hydroxide would be respectively 120 mg/m$^2$ and 15 mg/m$^2$ on both surfaces in terms of Cr.

Next, using a metal sheet coating device, the chromium-coated steel sheet was heated, and a polyester resin layer (inner surface coating layer) was formed on one of the front and back surfaces of the chromium-coated steel sheet and a polyester resin layer (outer surface coating layer) was formed on the other one of the front and back surfaces with pressure rolls. Specifically, a resin film was applied by heat sealing and then heat treatment was performed to produce a resin-coated metal sheet, according to the conditions listed in Table 1. The pressure rolls were internal water cooling type, and a coolant was forcibly circulated during coating to perform cooling during film adhesion. In Table 1, PET and PET/I respectively denote polyethylene terephthalate and isophthalic acid copolymerized polyethylene terephthalate.

50 mg/m$^2$ of paraffin wax having a melting point of 45° C. was applied to both surfaces of the resin-coated metal sheet, and then a blank of 123 mmφ was punched out. The blank was drawn into a cup of 71 mmφ in inner diameter and 36 mm in height by a commercially available cupping press. The cup was then charged into a commercially available DI forming device, and a can having a can inner diameter of 52 mm and a can height of 90 mm was formed. With a punch speed of 200 mm/s, a stroke of 560 mm, and redrawing and three-step ironing, the total reduction ratio was 50% (the reduction ratios in the respective steps were 30%, 19%, and 23%). During DI forming, tap water was circulated at a temperature of 50° C. as a coolant.

TABLE 1

| | Inner surface coating layer | | | | | | | | | Outer surface coating layer | |
|---|---|---|---|---|---|---|---|---|---|---|---|
| | Resin composition | | | Thickness | | | Amount of wax added | | | | |
| No | Main component composition | Copolymer component in main component | Main component copolymer amount (%) | Number of layers | Total thickness (μm) | Outermost layer thickness (μm) | Type of wax added | Outermost layer wax amount (mass %) | (*)Total wax amount (mass %) | Resin composition Main component composition | Thickness Number of layers |
| A1 | PET: 99% | — | — | 1 | 21 | 21 | Carnauba wax | 1.00 | 1.00 | PET40%-PBT60% | 2 |
| A2 | PET: 99.1% | — | — | 1 | 30 | 30 | Carnauba wax | 0.90 | 0.90 | PET40%-PBT60% | 2 |
| A3 | PET: 99.6% | — | — | 1 | 38 | 38 | Carnauba wax | 0.40 | 0.40 | PET40%-PBT60% | 2 |
| A4 | PET: 99.8% | — | — | 2 | 22 | 4 | Carnauba wax | 1.00 | 0.18 | PET40%-PBT60% | 2 |
| A5 | PET: 99.8% | — | — | 2 | 30 | 5 | Carnauba wax | 1.00 | 0.17 | PET40%-PBT60% | 2 |
| A6 | PET: 100% | — | — | 2 | 36 | 4 | Carnauba wax | 0.12 | 0.013 | PET40%-PBT60% | 2 |
| A7 | PET: 99.9% | — | — | 3 | 30 | 3 | Carnauba wax | 1.00 | 0.10 | PET40%-PBT60% | 3 |
| A8 | PET: 99.9% | Isophthalic acid | 3 | 2 | 30 | 4 | Carnauba wax | 1.00 | 0.13 | PET40%-PBT60% | 2 |
| A9 | PET: 99.9% | Isophthalic acid | 10 | 2 | 30 | 4 | Carnauba wax | 1.00 | 0.13 | PET40%-PBT60% | 2 |
| A10 | PET: 100% | — | — | 2 | 30 | 4 | Carnauba wax | 0.10 | 0.013 | PET40%-PBT60% | 2 |

TABLE 1-continued

| | | | | | | | | | | | |
|---|---|---|---|---|---|---|---|---|---|---|---|
| A11 | PET: 99.8% | — | — | 2 | 30 | 3 | Carnauba wax | 1.90 | 0.19 | PET40%-PBT60% | 2 |
| A12 | PET: 99.8% | — | — | 2 | 26 | 4 | Carnauba wax | 1.00 | 0.15 | PET40%-PBT60% | 2 |
| A13 | PET: 99.7% | — | — | 2 | 30 | 10 | Carnauba wax | 1.00 | 0.33 | PET40%-PBT60% | 2 |
| A14 | PET: 99.8% | — | — | 2 | 30 | 5 | Carnauba wax | 1.00 | 0.17 | PET40%-PBT60% | 2 |
| A15 | PET: 99.8% | — | — | 2 | 30 | 5 | Carnauba wax | 1.00 | 0.17 | PET40%-PBT60% | 2 |
| A16 | PET: 99.8% | — | — | 2 | 30 | 5 | Carnauba wax | 1.00 | 0.17 | PET40%-PBT60% | 1 |
| A17 | PET: 99.8% | — | — | 2 | 30 | 5 | Carnauba wax | 1.00 | 0.17 | PET40%-PBT60% | 1 |
| A18 | PET: 99.8% | — | — | 2 | 30 | 3 | Poly-ethylene | 1.00 | 0.10 | PET40%-PBT60% | 2 |
| A19 | PET: 99.9% | — | — | 2 | 30 | 3 | Carnauba wax | 1.00 | 0.10 | PET40%-PBT60% | 2 |
| A20 | PET: 99.9% | — | — | 2 | 30 | 3 | Carnauba wax | 1.00 | 0.10 | PET40%-PBT60% | 2 |
| A21 | PET: 97.8% | — | — | 1 | 30 | 30 | Carnauba wax | 2.20 | 2.20 | PET40%-PBT60% | 2 |
| A22 | PET: 100% | — | — | 2 | 30 | 1 | Carnauba wax | 0.25 | 0.0083 | PET40%-PBT60% | 2 |
| A23 | PET: 99.9% | — | — | 2 | 20 | 3 | Carnauba wax | 0.40 | 0.060 | PET40%-PBT60% | 2 |
| A24 | PET: 99.8% | — | — | 2 | 30 | 3 | Carnauba wax | 1.00 | 0.10 | PET40%-PBT60% | 2 |
| A25 | PET: 99.8% | — | — | 2 | 30 | 3 | Carnauba wax | 1.00 | 0.10 | PET40%-PBT60% | 2 |
| A26 | PET: 99% | — | — | 1 | 25 | 25 | Carnauba wax | 1.90 | 1.90 | PET40%-PBT60% | 1 |

| | Outer surface coating layer | | | | | Lamination conditions | | | | | |
|---|---|---|---|---|---|---|---|---|---|---|---|
| | Thickness | | Amount of wax added | | | | | | | | |
| No | Total thickness (μm) | Outermost layer thickness (μm) | Type of wax added | Outermost layer wax amount (mass %) | (Total wax amount (mass %) | Metal sheet temperature before lamination (° C.) | Time for resin film topass pressure roll (msec) | Pressure roll surface pressure (MPa) | Pressure roll surface temp-erature (° C.) | Heat treatment temperature and time after lamination (° C., sec) | Remarks |
| A1 | 20 | 2 | Polyethylene | 0.30 | 0.030 | 292 | 20 | 0.3 | 120 | 260° C., 5 s | Example |
| A2 | 20 | 2 | Polyethylene | 0.30 | 0.030 | 292 | 20 | 0.3 | 120 | 260° C., 5 s | Example |
| A3 | 20 | 2 | Polyethylene | 0.30 | 0.030 | 292 | 20 | 0.3 | 120 | 260° C., 5 s | Example |
| A4 | 20 | 2 | Polyethylene | 0.30 | 0.030 | 292 | 20 | 0.3 | 120 | 260° C., 5 s | Example |
| A5 | 20 | 2 | Polyethylene | 0.30 | 0.030 | 292 | 20 | 0.3 | 120 | 260° C., 5 s | Example |
| A6 | 20 | 2 | Polyethylene | 0.30 | 0.030 | 292 | 20 | 0.3 | 120 | 260° C., 5 s | Example |
| A7 | 20 | 2 | Polyethylene | 0.30 | 0.030 | 292 | 20 | 0.3 | 120 | 260° C., 5 s | Example |
| A8 | 20 | 2 | Polyethylene | 0.30 | 0.030 | 283 | 20 | 0.3 | 120 | 252° C., 5 s | Example |
| A9 | 20 | 2 | Polyethylene | 0.30 | 0.030 | 272 | 20 | 0.3 | 120 | 235° C., 5 s | Example |
| A10 | 20 | 2 | Polyethylene | 0.30 | 0.030 | 292 | 20 | 0.3 | 120 | 260° C., 5 s | Example |
| A11 | 20 | 2 | Polyethylene | 0.30 | 0.030 | 292 | 20 | 0.3 | 120 | 260° C., 5 s | Example |
| A12 | 20 | 2 | Polyethylene | 0.30 | 0.030 | 292 | 20 | 0.3 | 120 | 260° C., 5 s | Example |
| A13 | 20 | 2 | Polyethylene | 0.30 | 0.030 | 292 | 20 | 0.3 | 120 | 260° C., 5 s | Example |
| A14 | 20 | 2 | Polyethylene | 0.30 | 0.030 | 292 | 20 | 0.3 | 120 | 275° C., 5 s | Example |
| A15 | 20 | 2 | Polyethylene | 0.30 | 0.030 | 292 | 20 | 0.3 | 120 | 270° C., 1 s | Example |
| A16 | 20 | 20 | — | — | — | 292 | 20 | 0.3 | 120 | 260° C., 5 s | Example |
| A17 | 20 | 20 | Polyethylene | 0.03 | 0.030 | 292 | 20 | 0.3 | 120 | 260° C., 5 s | Example |
| A18 | 20 | 2 | Polyethylene | 0.30 | 0.030 | 292 | 20 | 0.3 | 120 | 260° C., 5 s | Example |
| A19 | 20 | 2 | Polyethylene | 0.30 | 0.030 | 292 | 20 | 0.3 | 120 | 245° C., 5 s | Comparative Example |
| A20 | 20 | 2 | Polyethylene | 0.30 | 0.030 | 292 | 20 | 0.3 | 120 | 280° C., 5 s | Comparative Example |
| A21 | 20 | 2 | Polyethylene | 0.30 | 0.030 | 292 | 20 | 0.3 | 120 | 260° C., 5 s | Comparative Example |
| A22 | 20 | 2 | Polyethylene | 0.30 | 0.030 | 292 | 20 | 0.3 | 120 | 260° C., 5 s | Comparative Example |
| A23 | 20 | 2 | Polyethylene | 0.30 | 0.030 | 292 | 20 | 0.3 | 120 | 260° C., 5 s | Comparative Example |

TABLE 1-continued

| | | | | | | | | | | | |
|---|---|---|---|---|---|---|---|---|---|---|---|
| A24 | 20 | 2 | Polyethylene | 0.30 | 0.030 | 292 | 20 | 0.3 | 120 | 260° C., 0.3 s | Comparative Example |
| A25 | 20 | 2 | Polyethylene | 0.30 | 0.030 | 292 | 20 | 0.3 | 120 | 260° C., 11 s | Comparative Example |
| A26 | 20 | 20 | — | — | — | 292 | 20 | 0.3 | 120 | 260° C., 5 s | Example |

(*)Total wax amount: average wax amount of all layers

The properties of each resin-coated metal sheet and the coating layer on the resin-coated metal sheet and the can performance after drawing and ironing were measured and evaluated by the following methods.

(1) Indentation Modulus of Surface of Coating Layer of Resin-Coated Metal Sheet

The indentation modulus of the resin-coated metal sheet was measured using a high-load unit of Nanoindentation Tester ENT-NEXUS produced by Elionix Inc. in accordance with ISO 14577-1/JIS Z 2255. The resin-coated metal sheet was sheared to a sample size of 10 mm×10 mm, and the measurement was carried out under the conditions of stage temperature: 30° C., indentation depth: 200 nm, and maximum load holding time: 1000 msec. The measurement was performed at five randomly selected positions on each of the two surfaces of the resin-coated metal sheet, and the average values on the respective surfaces were taken to be the indentation modulus of the inner surface coating layer and the indentation modulus of the outer surface coating layer. The measurement positions were apart from each other by 15 μm or more.

(2) Water Contact Angle of Surface of Inner Surface Coating Layer of Resin-Coated Metal Sheet after Heat Treatment The resin-coated metal sheet was sheared to a sample size of 30 mm×50 mm, then heat-treated in a hot air drying furnace so as to reach 220° C. in 2 min, and then cooled to room temperature. After this, the water contact angle was measured in an environment of 25° C. and a relative humidity of 50%. In the measurement of the contact angle, using water as a measurement liquid, the static contact angle of water on the resin film surface was measured using a contact angle meter (CA-DT type produced by Kyowa Interface Science Co., Ltd.) by a known method.

(3) Thermal Properties (Melting Point, Crystallization Temperature, Glass Transition Temperature) of Coating Layer of Resin-Coated Metal Sheet The resin-coated metal sheet was sheared to a sample size of 10 mm×50 mm, and then immersed in hydrochloric acid to dissolve only the metal sheet and isolate the coating layer. 5 mg of the isolated coating layer was collected in an aluminum pan as a sample, and measured using a differential scanning calorimeter (DSCQ100) produced by Ta Instruments Japan Inc. First, the sample was cooled to −50° C. in a nitrogen atmosphere, and then heated to 290° C. at 20° C./min (1st Run). From a chart obtained in the 1st Run measurement, the peak temperature of a fusion peak with enthalpy of fusion of 5 J/g or more was determined. The same measurement was performed three times for each sample, and the average value was taken to be the melting point. After heating the sample to 290° C. in this measurement, the sample was quenched with liquid nitrogen. Subsequently, the sample was reheated from −50° C. to 290° C. at 20° C./min (2nd Run). From a chart obtained in the 2nd Run measurement, the crystallization temperature and the glass transition temperature were determined. The same measurement was performed three times for each sample, and the respective average values were taken to be the crystallization temperature and the glass transition temperature.

(4) Drawing and Ironing Formability of Resin-Coated Metal Sheet

The evaluation was made based on whether a body fracture occurred after drawing and ironing. Each sample that developed a body fracture was evaluated as poor, and each sample that was able to be formed into a can was evaluated as good. Only for each sample that was able to be formed into a can, the following evaluations (5) to (9) were made. Before the evaluations, the can was heat-treated in a hot air drying furnace so as to reach 220° C. in 2 min and then cooled to room temperature, in order to release the residual stress of the coating layer resulting from can forming and enhance the adhesion property to the steel sheet.

(5) Water Contact Angle of Surface of Inner Surface Coating Layer of Drawn and Ironed Can A can body center portion of the drawn and ironed can was sheared to a sample size of 30 mm×50 mm, then heat-treated in a hot air drying furnace so as to reach 220° C. in 2 min, and then cooled to room temperature. After this, the water contact angle was measured in an environment of 25° C. and a relative humidity of 50%. In the measurement of the contact angle, using water as a measurement liquid, the static contact angle of water on the resin film surface was measured using a contact angle meter (CA-DT type produced by Kyowa Interface Science Co., Ltd.) by a known method.

(6) Indentation Modulus of Surface of Inner Surface Coating Layer of Drawn and Ironed Can The indentation modulus of the drawn and ironed can was measured using a high-load unit of Nanoindentation Tester ENT-NEXUS produced by Elionix Inc. A can body center portion of the drawn and ironed can was sheared to a sample size of 10 mm×10 mm, and the measurement was carried out under the conditions of stage temperature: 30° C., indentation depth: 200 nm, and maximum load holding time: 1000 msec. The measurement was performed at five randomly selected positions for each sample, and the average value was taken to be the indentation modulus of the sample. The measurement positions were apart from each other by 15 μm or more.

(7) Inner Surface Corrosion Resistance of Drawn and Ironed Can (Soundness of can Inner Surface Film after Forming)

The soundness (fewer film defects are better) of the can inner surface film after forming was evaluated to evaluate the inner surface corrosion resistance. Specifically, the film of the can mouth of the drawn and ironed can after cleaning and drying was scratched to enable current passing through the steel sheet part, an electrolytic solution (NaCl: 1% solution, temperature: 25° C.) was charged into the can up to the can mouth, and a voltage of 6 V was applied between the can body and the electrolytic solution. Based on the current value measured as a result, the corrosion resistance was evaluated according to the following criteria:

Poor: more than 0.5 mA.

Satisfactory: more than 0.1 mA and 0.5 mA or less.

Good: more than 0.01 mA and 0.1 mA or less.

Excellent: 0.01 mA or less.

(8) Outer Surface Coatability of Drawn and Ironed Can (Soundness of can Outer Surface Film after Forming)

The soundness (fewer film defects are better) of the can outer surface film after forming was evaluated to evaluate the outer surface coatability. Specifically, the film of the can mouth of the drawn and ironed can after cleaning and drying was scratched to enable current passing through the steel sheet part, and the can was put in a container containing the same electrolytic solution as above with the bottom down in a state in which only the outer surface of the can was in contact with the electrolytic solution. Based on the current value measured when applying a voltage of 6 V between the can body and the electrolytic solution, the outer surface coatability was evaluated according to the following criteria:

Unsatisfactory: more than 1 mA.

Satisfactory: more than 0.2 mA and 1 mA or less.

Good: more than 0.05 mA and 0.2 mA or less.

Excellent: 0.05 mA or less.

(9) Contents Removability of Drawn and Ironed Can

Cured meat for luncheon meat (protein content percentage in solid content: 60 mass %) was charged into the drawn and ironed can and a lid was seamed to the can, and then retort sterilization treatment (130° C., 90 min) was performed. The lid was then removed, and the can was turned upside down to remove the contents. By observing the degree of the contents remaining inside the can, the removability of the contents was evaluated according to the following criteria. (Ratings)

Excellent: The contents were able to be removed simply by turning the can upside down (without shaking the can by hand), and substantially no adhered matter was found when observing the can inner surface with the naked eye after the removal.

Good: The contents slightly remained (the area of adhesion being less than 10% of the whole area) on the can inside when simply turning the can upside down, but the contents were able to be removed when vibrating the can up and down (e.g. shaking the can by hand). Substantially no adhered matter was found when observing the can inner surface with the naked eye after the removal.

Satisfactory: The contents remained (the area of adhesion being 10% or more of the whole area) on the can inside when simply turning the can upside down, but the contents were able to be removed when vibrating the can up and down (e.g. shaking the can by hand). Substantially no adhered matter was found when observing the can inner surface with the naked eye after the removal.

Poor: The contents were hard to be removed simply by vibrating the can up and down (e.g. shaking the can by hand). Adhered matter was clearly visible when observing the can inner surface with the naked eye after the speed of vibrating the can up and down was significantly increased or an instrument such as a spoon was used to forcibly remove the contents.

[Evaluation]

The evaluation results are listed in Table 2. As can be understood from Table 2, at least one of the performances of the drawn and ironed can in each Comparative Example was evaluated as poor (unusable), whereas all of the performances of the drawn and ironed can in each Example were evaluated as excellent, good, satisfactory, or unsatisfactory (usable). This demonstrates that a resin-coated metal sheet for cans according to the present disclosure can ensure excellent removability for various contents when formed into a DI can by drawing and ironing. Moreover, the resin-coated metal sheet for cans can stably satisfy various properties required of container material.

TABLE 2

| | Coating layer thermal properties | | | Evaluation results | | | |
|---|---|---|---|---|---|---|---|
| No | Coating layer melting point (° C.) | Coating layer glass transition temperature (° C.) | Coating layer crystallization temperature (° C.) | Indentation modulus of surface of inner surface coating layer of resin-coated metal sheet (MPa) | Indentation modulus of surface of outer surface coating layer of resin-coated metal sheet (MPa) | Water contact angle of surface of inner surface coating layer of resin-coated metal sheet after heat treatment (°) | Drawing and ironing formability of resin-coated metal sheet |
| A1 | 255 | 79 | 95 | 2290 | 2150 | 90 | Good |
| A2 | 255 | 79 | 95 | 2290 | 2160 | 89 | Good |
| A3 | 255 | 79 | 95 | 2310 | 2180 | 84 | Good |
| A4 | 255 | 79 | 95 | 2320 | 2170 | 90 | Good |
| A5 | 255 | 79 | 95 | 2300 | 2160 | 90 | Good |
| A6 | 255 | 79 | 95 | 2350 | 2200 | 82 | Good |
| A7 | 255 | 79 | 95 | 2320 | 2140 | 90 | Good |
| A8 | 248 | 79 | 110 | 2160 | 3200 | 90 | Good |
| A9 | 230 | 79 | 120 | 2000 | 3700 | 90 | Good |
| A10 | 255 | 79 | 95 | 2330 | 2170 | 81 | Good |
| A11 | 255 | 79 | 95 | 2080 | 2100 | 95 | Good |
| A12 | 255 | 79 | 95 | 2300 | 2140 | 90 | Good |
| A13 | 255 | 79 | 95 | 2280 | 2100 | 90 | Good |
| A14 | 255 | 79 | 95 | 2000 | 2030 | 85 | Good |
| A15 | 255 | 79 | 95 | 3240 | 2470 | 90 | Good |
| A16 | 255 | 79 | 95 | 2300 | 2120 | 90 | Good |
| A17 | 255 | 79 | 95 | 2310 | 2130 | 90 | Good |
| A18 | 255 | 79 | 95 | 2330 | 2200 | 90 | Good |

TABLE 2-continued

| | | | | | | | |
|---|---|---|---|---|---|---|---|
| A19 | 255 | 79 | 95 | 3710 | 3480 | 90 | Good |
| A20 | 255 | 79 | 95 | 1930 | 1900 | 90 | Good |
| A21 | 255 | 79 | 95 | 2160 | 2160 | 102 | Good |
| A22 | 255 | 79 | 95 | 2350 | 2200 | 78 | Good |
| A23 | 255 | 79 | 95 | 2250 | 2120 | 85 | Good |
| A24 | 255 | 79 | 95 | 3820 | 3620 | 90 | Good |
| A25 | 255 | 79 | 95 | 1870 | 1830 | 90 | Good |
| A26 | 255 | 79 | 95 | 2200 | 2150 | 91 | Good |

| | Evaluation results | | | | | |
|---|---|---|---|---|---|---|
| No | Water contact angle of surface of inner surface coating layer of drawn and ironed can (°) | Indentation modulus of surface of inner surface coating layer of drawn and ironed can (MPa) | Inner surface corrosion resistance of drawn and ironed can (soundness of can inner surface film after forming) | Outer surface coatability of drawn and ironed can (soundness of can outer surface film after forming) | Contents removability of drawn and ironed can | Remarks |
| A1 | 87 | 2340 | Satisfactory | Excellent | Good | Example |
| A2 | 89 | 2330 | Good | Excellent | Excellent | Example |
| A3 | 84 | 2370 | Excellent | Excellent | Good | Example |
| A4 | 80 | 2380 | Satisfactory | Excellent | Satisfactory | Example |
| A5 | 90 | 2360 | Excellent | Excellent | Excellent | Example |
| A6 | 82 | 2400 | Excellent | Excellent | Satisfactory | Example |
| A7 | 88 | 2360 | Excellent | Excellent | Excellent | Example |
| A8 | 88 | 2150 | Good | Satisfactory | Excellent | Example |
| A9 | 85 | 2040 | Satisfactory | Unsatisfactory | Good | Example |
| A10 | 81 | 2380 | Excellent | Excellent | Satisfactory | Example |
| A11 | 95 | 2070 | Satisfactory | Excellent | Excellent | Example |
| A12 | 88 | 2360 | Excellent | Excellent | Excellent | Example |
| A13 | 90 | 2350 | Good | Excellent | Excellent | Example |
| A14 | 86 | 2040 | Satisfactory | Excellent | Good | Example |
| A15 | 81 | 3250 | Good | Excellent | Satisfactory | Example |
| A16 | 90 | 2360 | Excellent | Satisfactory | Excellent | Example |
| A17 | 90 | 2370 | Excellent | Good | Excellent | Example |
| A18 | 85 | 2380 | Good | Excellent | Excellent | Example |
| A19 | 78 | 3550 | Poor | Unsatisfactory | Poor | Comparative Example |
| A20 | 84 | 1940 | Poor | Good | Good | Comparative Example |
| A21 | 102 | 2180 | Poor | Excellent | Excellent | Comparative Example |
| A22 | 78 | 2370 | Good | Excellent | Poor | Comparative Example |
| A23 | 78 | 2300 | Poor | Excellent | Poor | Comparative Example |
| A24 | 78 | 3550 | Poor | Unsatisfactory | Poor | Comparative Example |
| A25 | 84 | 1900 | Poor | Good | Good | Comparative Example |
| A26 | 88 | 2250 | Satisfactory | Excellent | Excellent | Example |

The invention claimed is:

1. A resin-coated metal sheet comprising:

a metal sheet; and a coating layer of a resin containing a polyester resin as a main component, on each of both surfaces of the metal sheet, wherein the coating layer on at least one surface of the both surfaces of the metal sheet has a thickness of 21 μm or more and 38 μm or less, contains 0.01 mass % or more and 2.00 mass % or less of a wax compound, and has a surface indentation modulus of 2000 MPa or more and 3400 MPa or less; and the surface of the coating layer has a water contact angle of 80° or more and 100° or less after heat treatment at 220° C. for 2 min.

2. The resin-coated metal sheet according to claim 1, wherein the coating layer on the at least one surface is made up of at least two layers that differ in content percentage of the wax compound, and an outermost layer of the at least two layers has a thickness of 3 μm or more and 10 μm or less and contains 0.10 mass % or more and 2.00 mass % or less of the wax compound.

3. The resin-coated metal sheet according to claim 2, wherein the coating layer on an other surface of the both surfaces of the metal sheet contains 0.01 mass % or more and 2.00 mass % or less of the wax compound and has a surface indentation modulus of 2000 MPa or more and 3400 MPa or less.

4. The resin-coated metal sheet according to claim 3, wherein the wax compound contains carnauba wax.

5. The resin-coated metal sheet according to claim 2, wherein the wax compound contains carnauba wax.

6. The resin-coated metal sheet according to claim 1, wherein the coating layer on an other surface of the both surfaces of the metal sheet contains 0.01 mass % or more and 2.00 mass % or less of the wax compound and has a surface indentation modulus of 2000 MPa or more and 3400 MPa or less.

7. The resin-coated metal sheet according to claim 6, wherein the wax compound contains carnauba wax.

8. The resin-coated metal sheet according to claim 1, wherein the wax compound contains carnauba wax.

9. The resin-coated metal sheet according to claim 1, wherein, the metal sheet is a chromium-coated steel sheet, the resin is polyethylene terephthalate (PET), isophthalic acid copolymerized polyethylene terephthalate (PET/I) and/or polybutylene terephthalate (PBT), and the wax compound is carnauba wax and/or polyethylene.

10. The resin-coated metal sheet according to claim 1, wherein, the coating layer is composed of a biaxially stretched film.

11. A method of producing a resin-coated drawn and ironed can, comprising:

drawing the resin-coated metal sheet according to claim 1 to form a cup-shaped formed body; and ironing the cup-shaped formed body to have a can body having a minimum sheet thickness being 80% or less of an original sheet thickness.

12. A method of producing a resin-coated drawn and ironed can, comprising:

drawing the resin-coated metal sheet according to claim 2 to form a cup-shaped formed body; and ironing the cup-shaped formed body to have a can body having a minimum sheet thickness being 80% or less of an original sheet thickness.

13. A method of producing a resin-coated drawn and ironed can, comprising:

drawing the resin-coated metal sheet according to claim 6 to form a cup-shaped formed body; and ironing the cup-shaped formed body to have a can body having a minimum sheet thickness being 80% or less of an original sheet thickness.

14. A method of producing a resin-coated drawn and ironed can, comprising:

drawing the resin-coated metal sheet according to claim 8 to form a cup-shaped formed body; and ironing the cup-shaped formed body to have a can body having a minimum sheet thickness being 80% or less of an original sheet thickness.

15. A method of producing a resin-coated drawn and ironed can, comprising:

drawing the resin-coated metal sheet according to claim 3 to form a cup-shaped formed body; and ironing the cup-shaped formed body to have a can body having a minimum sheet thickness being 80% or less of an original sheet thickness.

16. A method of producing a resin-coated drawn and ironed can, comprising:

drawing the resin-coated metal sheet according to claim 5 to form a cup-shaped formed body; and ironing the cup-shaped formed body to have a can body having a minimum sheet thickness being 80% or less of an original sheet thickness.

17. A method of producing a resin-coated drawn and ironed can, comprising:

drawing the resin-coated metal sheet according to claim 7 to form a cup-shaped formed body; and ironing the cup-shaped formed body to have a can body having a minimum sheet thickness being 80% or less of an original sheet thickness.

18. A method of producing a resin-coated drawn and ironed can, comprising:

drawing the resin-coated metal sheet according to claim 4 to form a cup-shaped formed body; and ironing the cup-shaped formed body to have a can body having a minimum sheet thickness being 80% or less of an original sheet thickness.

* * * * *